(12) United States Patent
Park et al.

(10) Patent No.: US 12,248,241 B2
(45) Date of Patent: Mar. 11, 2025

(54) CAMERA LENS BARREL, CAMERA MODULE, AND OPTICAL DEVICE

(71) Applicant: LG INNOTEK CO., LTD., Seoul (KR)

(72) Inventors: Jae Keun Park, Seoul (KR); Tae Min Ha, Seoul (KR); Doo Shik Shin, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 18/461,969

(22) Filed: Sep. 6, 2023

(65) Prior Publication Data

US 2023/0408888 A1 Dec. 21, 2023

Related U.S. Application Data

(63) Continuation of application No. 17/155,323, filed on Jan. 22, 2021, now Pat. No. 11,789,338, which is a
(Continued)

(30) Foreign Application Priority Data

| Sep. 26, 2016 | (KR) | 10-2016-0122981 |
| Oct. 25, 2016 | (KR) | 10-2016-0139119 |
| Oct. 25, 2016 | (KR) | 10-2016-0139120 |

(51) Int. Cl.
*G03B 9/02* (2021.01)
*G02B 5/20* (2006.01)
(Continued)

(52) U.S. Cl.
CPC ............... *G03B 9/02* (2013.01); *G02B 5/208* (2013.01); *G02B 7/02* (2013.01); *G03B 9/04* (2013.01);
(Continued)

(58) Field of Classification Search
CPC ... G03B 9/02; G03B 9/04; G03B 9/08; G03B 11/00; G03B 2205/0069; G03B 30/00;
(Continued)

(56) References Cited

U.S. PATENT DOCUMENTS

| 10,948,803 | B2 | 3/2021 | Park et al. | |
| 11,789,338 | B2 * | 10/2023 | Park | G03B 9/04 |
| | | | | 348/294 |

(Continued)

FOREIGN PATENT DOCUMENTS

| CN | 1458886 A | 11/2003 |
| CN | 101352031 A | 1/2009 |

(Continued)

OTHER PUBLICATIONS

International Search Report in International Application No. PCT/KR2017/010526, filed Sep. 25, 2017.
(Continued)

*Primary Examiner* — Ahmed A Berhan
(74) *Attorney, Agent, or Firm* — Saliwanchik, Lloyd & Eisenschenk

(57) ABSTRACT

The present invention comprises: a base; a housing disposed at one side of the base; a lens barrel disposed inside the housing; a cover disposed at one side of the housing; a first substrate disposed at the other side of the base; an image sensor which is installed on the first substrate, and disposed below the lens barrel; a diaphragm set which is movably supported inside the housing and which adjusts the amount of light incident to the lens barrel; a first drive unit comprising a first coil and a first magnet which enable the lens barrel and the diaphragm set to move together in the optical axis direction; and a second substrate which is attached to the housing and comprises a plurality of terminals which protrude to the outside as a result of the drive of the first
(Continued)

drive unit, wherein the diaphragm set has a second drive unit for driving the diaphragms disposed therein, and the terminals are also connected to the second drive unit.

20 Claims, 13 Drawing Sheets

Related U.S. Application Data continuation of application No. 16/336,377, filed as application No. PCT/KR2017/010526 on Sep. 25, 2017, now Pat. No. 10,948,803.

(51) Int. Cl.
| | | |
|---|---|---|
| *G02B 7/02* | (2021.01) | |
| *G03B 9/04* | (2021.01) | |
| *G03B 9/08* | (2021.01) | |
| *G03B 11/00* | (2021.01) | |
| *H02K 41/035* | (2006.01) | |
| *H04N 23/00* | (2023.01) | |
| *H04N 23/51* | (2023.01) | |
| *H04N 23/54* | (2023.01) | |
| *H04N 23/55* | (2023.01) | |
| *H04N 23/60* | (2023.01) | |
| *H04N 25/00* | (2023.01) | |

(52) U.S. Cl.
CPC .............. *G03B 9/08* (2013.01); *G03B 11/00* (2013.01); *H04N 23/00* (2023.01); *H04N 23/51* (2023.01); *H04N 23/54* (2023.01); *H04N 23/55* (2023.01); *H04N 23/60* (2023.01); *H04N 25/00* (2023.01); *H02K 41/0354* (2013.01)

(58) Field of Classification Search
CPC .......... G02B 5/208; G02B 7/02; G02B 7/005; G02B 7/021; G02B 7/023; G02B 27/646; H04N 23/00; H04N 23/51; H04N 23/54; H04N 23/55; H04N 23/60; H04N 25/00; H04N 23/57; H02K 41/0354
See application file for complete search history.

(56) References Cited

U.S. PATENT DOCUMENTS

| | | |
|---|---|---|
| 2005/0275740 A1 | 12/2005 | Nagano |
| 2009/0052886 A1 | 2/2009 | Watanabe et al. |
| 2011/0206365 A1* | 8/2011 | Yoo .......................... G03B 9/14 396/463 |
| 2014/0066122 A1 | 3/2014 | Shukla et al. |
| 2014/0184899 A1 | 7/2014 | McKinley |
| 2015/0355431 A1 | 12/2015 | Garvey et al. |
| 2016/0033739 A1 | 2/2016 | Topliss |
| 2017/0108705 A1 | 4/2017 | Yu et al. |
| 2017/0195530 A1 | 7/2017 | Chen et al. |
| 2019/0049692 A1 | 2/2019 | Choi et al. |

FOREIGN PATENT DOCUMENTS

| | | |
|---|---|---|
| CN | 101493564 A | 7/2009 |
| CN | 103765310 A | 4/2014 |
| CN | 105282434 A | 1/2016 |
| JP | 2002-296479 A | 10/2002 |
| JP | 2005-352160 A | 12/2005 |
| JP | 2006-47364 A | 2/2006 |
| JP | 2007-108596 A | 4/2007 |
| JP | 2007-232807 A | 9/2007 |
| JP | 2007-271670 A | 10/2007 |
| JP | 2012-141507 A | 7/2012 |
| JP | 2015-90484 A | 5/2015 |
| KR | 10-2007-0005945 A | 1/2007 |
| KR | 10-2010-0092820 A | 8/2010 |
| KR | 10-2010-0138269 A | 12/2010 |
| KR | 10-1082044 B1 | 11/2011 |
| KR | 10-1575346 B1 | 12/2015 |
| WO | 2015/133759 A1 | 9/2015 |
| WO | 2016/136931 A1 | 9/2016 |

OTHER PUBLICATIONS

Office Action dated Jun. 11, 2020 in U.S. Appl. No. 16/336,377.
Notice of Allowance dated Sep. 30, 2020 in U.S. Appl. No. 16/336,377.
Office Action dated Jan. 6, 2021 in Chinese Application No. 201780058320.4.
Office Action dated Aug. 31, 2021 in Japanese Application No. 2019-516132.
Office Action dated Apr. 25, 2022 in Japanese Application No. 2019-516132.
Office Action dated Feb. 25, 2022 in U.S. Appl. No. 17/155,323.
Office Action dated Sep. 9, 2022 in U.S. Appl. No. 17/155,323.
Office Action dated Jan. 17, 2023 in U.S. Appl. No. 17/155,323.
Notice of Allowance dated Jun. 7, 2023 in U.S. Appl. No. 17/155,323.
Office Action dated Apr. 8, 2024 in Korean Application No. 10-2016-0122981.
Office Action dated Apr. 11, 2024 in Korean Application No. 10-2016-0139120.
Office Action dated May 23, 2024 in European Application No. 17 853 484.8.

* cited by examiner

100

CAMERA LENS BARREL, CAMERA MODULE, AND OPTICAL DEVICE

CROSS-REFERENCE TO RELATED APPLICATIONS

This application is a continuation of U.S. application Ser. No. 17/155,323, filed Jan. 22, 2021; which is a continuation of U.S. application Ser. No. 16/336,377, filed Mar. 25, 2019, now U.S. Pat. No. 10,948,803, issued Mar. 16, 2021; which is the U.S. national stage application of International Patent Application No. PCT/KR2017/010526, filed Sep. 25, 2017, which claims the benefit under 35 U.S.C. § 119 of Korean Application Nos. 10-2016-0122981, filed Sep. 26, 2016; 10-2016-0139119, filed Oct. 25, 2016; and 10-2016-0139120, filed Oct. 25, 2016; the disclosures of each of which are incorporated herein by reference in their entirety.

TECHNICAL FIELD

The present exemplary embodiment relates to a camera lens barrel, camera module, and an optical device.

BACKGROUND ART

The following description provides background information for the present exemplary embodiment and does not describe the prior art.

As various portable terminals are widely spread and commonly used, and wireless internet services has been commercialized, the demands of consumers related to portable terminals have been diversified and various kinds of additional devices have been installed in portable terminals.

As a typical example among them, there is a camera module for taking a picture or a video of a subject. Meanwhile, an auto focus (AF) function that automatically adjusts focus according to the distance to the subject has been applied to a recent camera module. In addition, an optical image stabilization (OIS) function that inhibits an image from shaking caused by the shaking of a photographer has been applied.

Besides, configurations comprising a diaphragm for implementing additional functions have been suggested for a camera module.

The diaphragm adjusts the degree of opening of the lens by a separate actuator, and is usually located between the front lens and the rear lens among the lens groups of the camera module, therefore the electrical connection with the main board is continuously maintained with the mobility along the optical axis. Thus, there is a disadvantage in that the manufacturing cost of the total module increases.

Further, the diaphragm adjusts the degree of opening of the lens by a separate actuator, and is usually located between the front lens and the rear lens among the lens groups of the camera module, so that there is a lot of difficulty in assembling.

DETAILED DESCRIPTION OF THE INVENTION

Technical Subject

An objective of the present invention, conceived to overcome the above problems, is to provide a camera module and an optical device that are easy to manufacture since the electrical connection between a main control device and a diaphragm device included in a lens barrel is convenient Another objective of the present invention, conceived to overcome the above problems, is to provide a camera lens barrel wherein the combining of the diaphragm between the front lens and the rear lens is easy, and also the assembling of the lenses can be performed conveniently.

Technical Solution

In order to achieve the above described objectives, the present invention comprises: a base; a housing disposed at one side of the base; a lens barrel disposed inside the housing; a cover disposed at one side of the housing; a first substrate disposed at the other side of the base; an image sensor which is installed on the first substrate, and disposed below the lens barrel; a diaphragm set which is movably supported inside the housing and which adjusts the amount of light incident to the lens barrel; a first drive unit comprising a first coil and a first magnet which enable the lens barrel and the diaphragm set to move together in the optical axis direction; and a second substrate which is attached to the housing and comprises a plurality of terminals protruded towards the outside for driving the first drive unit, wherein the diaphragm set has a second drive unit for driving the diaphragms disposed therein, and the plurality of terminals are also connected to the second drive unit.

Preferably, the diaphragm set comprises: a diaphragm part for adjusting the diameter of an incident tube incident on the lens barrel; a diaphragm support unit to which the diaphragm part is fixed; and an elastic support unit having one end attached to the diaphragm support unit and the other end fixed to the second substrate.

More preferably, a plurality of wirings are disposed in the elastic support unit, thereby electrically connecting the second substrate and the second drive unit.

Yet more preferably, the second drive unit comprises a second magnet and a second coil, and the second substrate and the second coil are electrically connected.

Preferably, the lens barrel is disposed below the diaphragm unit.

Preferably, the lens barrel comprises a first lens barrel unit and a second lens barrel unit which are spaced apart from each other, and the diaphragm part is disposed between the first lens barrel unit and the second lens barrel unit.

Preferably, the first coil is mounted on the second substrate.

More preferably, it further comprises a first Hall sensor mounted on the second substrate.

More preferably, the first Hall sensor and the first coil are electrically connected to the first substrate through the plurality of terminals.

Preferably, the diaphragm set further comprises a second Hall sensor disposed inside, and the second Hall sensor is electrically connected to the second substrate through the elastic support unit.

Preferably, the number of the plurality of terminals is four.

More preferably, the plurality of terminals comprises a power line, a ground line, and two control lines.

More preferably, the two control lines are wirings for I2C communication.

Preferably, the drive wirings of the first drive unit and the drive wirings of the second drive unit are electrically connected to each other having the same characteristics.

Preferably, the diaphragm support unit comprises a plurality of separated parts.

Preferably, the diaphragm set further comprises a lens coupling portion to which the lens barrel is coupled, and the lens barrel is coupled to the lens coupling portion.

Preferably, the lens barrel comprises a first lens barrel unit and a second lens barrel unit spaced apart from each other, and the first lens barrel unit comprises a first lens barrel portion and a second lens barrel portion, the second lens barrel portion is coupled to the second lens barrel unit, and the diaphragm part is disposed between the first lens barrel unit and the second lens barrel unit.

Preferably, an infrared cut filter disposed between the lens barrel and the image sensor is further included.

Preferably, the elastic support unit comprises: a fixing portion that is in contact with one surface of the diaphragm support unit; a vertical connecting portion that couples with the diaphragm part; a vertical drawing portion that couples with the second substrate; and an elastic portion disposed between the fixing portion and the vertical drawing portion and providing elastic characteristics.

More preferably, the elastic portion comprises a unit elastic portion which imparts an elastic characteristic by a plurality of bent portions, and two each of the unit elastic portions are disposed in a symmetrical manner with respect to an opening portion located at the center.

Also, a main body; a display unit disposed in one surface of the main body; and a camera module electrically connected to the display unit are included, wherein the camera module comprises: a base; a housing disposed on one side of the base; a lens barrel disposed inside the housing; a cover disposed on one side of the housing; a first substrate disposed on the other side of the base; an image sensor mounted on the first substrate and disposed below the lens barrel; a diaphragm set movably supported in the housing and adjusting an amount of light incident on the lens barrel; a first drive unit comprising a first magnet and a first coil for moving the lens barrel and the diaphragm set together in an optical axis direction; and a second substrate attached to the housing and comprising a plurality of terminals exposed to the outside for driving the first drive unit, wherein the second drive unit for driving the diaphragm is disposed in the diaphragm set, and the plurality of terminals are also connected to the second drive unit.

In order to achieve the above described objectives, the present invention comprises: a body including an inner diameter portion through which a through hole is formed; a coupling hole formed on a side surface of the body penetrating through the body; a separating stage located inside the body; a front lens group being inserted from the front of the body and fixed inside the body; a rear lens group being inserted from the rear of the body and fixed to the inside of the body; and a diaphragm inserted through the coupling hole so as to adjust the diameter of the incident light.

Preferably, it is characterized in that the separating stage is formed of two members symmetrically disposed on a surface facing the inside of the body.

More preferably, it is characterized in that the separating stage further comprises an arc portion.

Preferably, it is characterized in that the body is divided into an upper section and a lower section, and further comprises a cap fixing portion coupled to the upper section and a lens cap coupled to the cap fixing portion.

More preferably, it is characterized in that the cap fixing portion further comprises a lens hole formed in the center thereof.

Preferably, it is characterized in that the diaphragm is inserted into the coupling hole and is located in the space between the separating stages in the body.

Preferably, it is characterized in that the rear lens group comprises a plurality of lenses having different diameters, and the body includes a plurality of stages corresponding to diameters of the lenses located in the inner diameter portion.

Further, the present invention comprises: a lens barrel disposed at one side of a main body; a printed circuit board disposed at the other side of the main body; an image sensor aligned with the optical axis of the lens barrel and mounted on the printed circuit board; and an infrared cut filter disposed between the lens barrel and the image sensor, wherein the lens barrel comprises: a body including an inner diameter portion through which a through hole is formed; a coupling hole formed penetrating through the body on a side surface of the body; a separating stage located inside the body; a front lens group being inserted from the front of the body and fixed inside the body; a rear lens group being inserted from the rear of the body and fixed to the inside of the body; and a diaphragm inserted through the coupling hole so as to adjust the diameter of the incident tube.

In order to achieve the above objectives, an exemplary embodiment according to the present invention comprises: a body comprising an inner diameter portion wherein a space is formed; a plurality of coupling grooves formed at the same position of the side surface of the body by penetrating the body laterally; a front lens group being inserted from the rear of the body and positioned in front of the body; a bracket being inserted into the coupling groove and penetrating through the side surface of the body; a rear lens group being inserted from the rear of the body having one side surface thereof supported by the bracket; and a diaphragm inserted into the opening portion of the bracket and positioned between the front lens group and the rear lens group.

Preferably, it is characterized in that the body further comprises a cap portion positioned at an upper end to support an upper end of the front lens group.

More preferably, it is characterized in that the cap portion further comprises a front hole for exposing the front lens group at the center thereof.

Preferably, it is characterized in that the bracket supports the entire structure, and comprises a support comprising an opening for accommodating the diaphragm therein, and a protruded end located at an upper end of the support.

More preferably, it is characterized in that in the support, an inclined portion which guides the diaphragm being inserted into the opening.

Preferably, it is characterized in that the diameter of the individual lenses of the front lens group is equal to or smaller than the lens diameter of the minimum diameter among the rear lens groups.

More preferably, it is characterized in that the rear lens group comprises a plurality of lenses having different diameters, and the body comprises a plurality of stages corresponding to diameters of the lenses located in the inner diameter portion.

An exemplary embodiment according to the present invention comprises: a main body; a lens barrel disposed at one side of the main body; a printed circuit board disposed at the other side of the main body; an image sensor aligned with an optical axis of the lens barrel and mounted on the printed circuit board; and an infrared cut filter disposed between the lens barrel and the image sensor, wherein the lens barrel comprises: a body comprising an inner diameter portion wherein a space is formed; a plurality of coupling grooves formed at the same position of the side surface of the body by penetrating the body laterally; a front lens group being inserted from the rear of the body and positioned in front of the body; a bracket being inserted into the coupling groove and penetrating through the side surface of the body;

a rear lens group being inserted from the rear of the body having one side surface thereof supported by the bracket; and a diaphragm inserted into the opening portion of the bracket and positioned between the front lens group and the rear lens group.

An exemplary embodiment according to the present invention comprises: a main body; a display unit disposed at one side surface of the main body; and a camera module electrically connected to the display unit, wherein the camera module comprises: a base; a lens barrel disposed at one side of the base; a printed circuit board disposed at the other side of the base; an image sensor aligned with an optical axis of the lens barrel and mounted on the printed circuit board; and an infrared cut filter disposed between the lens barrel and the image sensor, and wherein the lens barrel comprises: a body comprising an inner diameter portion wherein a space is formed; a plurality of coupling grooves formed at the same position of the side surface of the body so as to penetrate the body laterally; a front lens group being inserted from the rear of the body and positioned in front of the body; a bracket being inserted into the coupling groove and penetrating through the side surface of the body; a rear lens group being inserted from the rear of the body having one side surface thereof supported by the bracket; and a diaphragm inserted into the opening portion of the bracket and positioned between the front lens group and the rear lens group.

Advantageous Effects

A camera module and an optical device according to the present invention provide an effect in that the terminals connected to the outside are minimized by disposing a control unit integrally formed with a sensor for detecting the degree of opening of the diaphragm in the diaphragm part, and also common terminals are implemented to be used for both of the terminals for driving the auto focusing device and the terminals for driving the diaphragm, and are selectively driven so that the sharing and simplifying the wirings can be achieved, thereby reducing the manufacturing cost of the camera module and the optical device.

A camera lens barrel comprising the diaphragm according to the present invention provides an effect in that a coupling hole is formed on the side surface of the barrel, a front lens group is coupled through from the front of the barrel, a rear lens group is coupled through from the rear of the barrel, and the diaphragm is combined through the coupling hole formed in the side surface of the barrel, and therefore the entire lens barrel manufacturing becomes very convenient.

A camera lens barrel comprising the diaphragm according to the present invention provides an effect in that a coupling groove is formed on the side surface of the body of the barrel, the front lens group is assembled first through the rear of the body, the bracket is inserted through the coupling groove, then the rear lens group is inserted and assembled, and finally the diaphragm is inserted into the opening of the bracket to complete the entire barrel assembly, and therefore, the assembling of the lens groups and the diaphragm becomes very convenient.

BEST MODE

Figure 1:
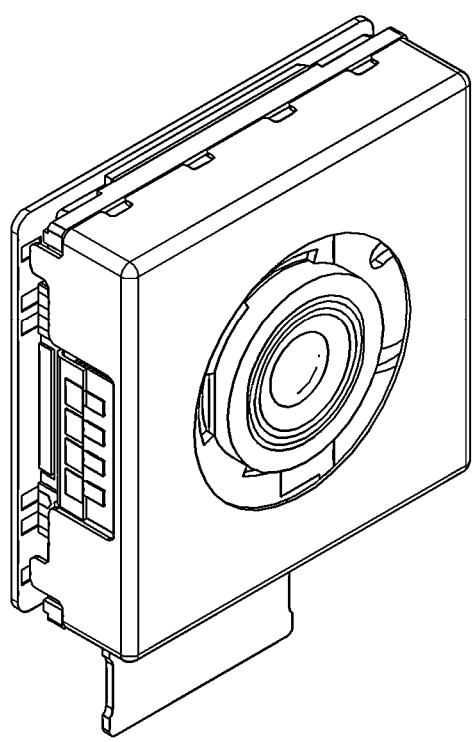
FIG. 1 is a perspective view showing an outline of a camera module according to a first exemplary embodiment of the present invention.

Hereinafter, some exemplary embodiments of the present invention will be described with reference to exemplary drawings. In describing the components in the drawings, the same components are denoted by the same reference numerals whenever possible, even if they are shown on other drawings.

In describing the components of the exemplary embodiment of the present invention, terms such as first, second, A, B, (a), and (b) may be used. These terms are merely intended to distinguish the components from other components, and the terms do not limit the nature, order or sequence of the components. When a component is described as being "connected," "coupled," or "jointed" to another component, the component may be directly connected, coupled, or jointed to the other component, however, it should be understood that another element may be "connected," "coupled," or "jointed" between components.

The "optical axis direction" used below is defined as the optical axis direction of the lens module in a state of being coupled to the lens driving device. On the other hand, "optical axis direction" can be used in combination with "vertical direction," "z-axis," and the like.

The "autofocus function" used below is defined as a function that automatically matches the focus on a subject by adjusting the distance to the image sensor by moving the lens module along the optical axis according to the distance of the subject so that a clear image of the subject can be obtained on the image sensor. On the other hand, "auto focus" can be used in combination with "auto focus (AF)".

The "camera shake correction function" used below is defined as a function of moving or tilting the lens module in the direction perpendicular to the optical axis direction so as to cancel the vibration (motion) generated in the image sensor by an external force. On the other hand, "camera shake correction" can be used in combination with "optical image stabilization (OIS)".

Hereinafter, preferred exemplary embodiments of the present invention will be described in detail with reference to the accompanying drawings.

The camera module 100 having a diaphragm device according to the first exemplary embodiment of the present invention has an outline as shown in FIG. 1.

A first substrate 2 having a rectangular box-shaped outline, a lens disposed at the center of the front surface, and a rear surface mounted with various components for image signal processing and the like, is disposed, however, the outline may be changed to other type of shape.

Figure 2:
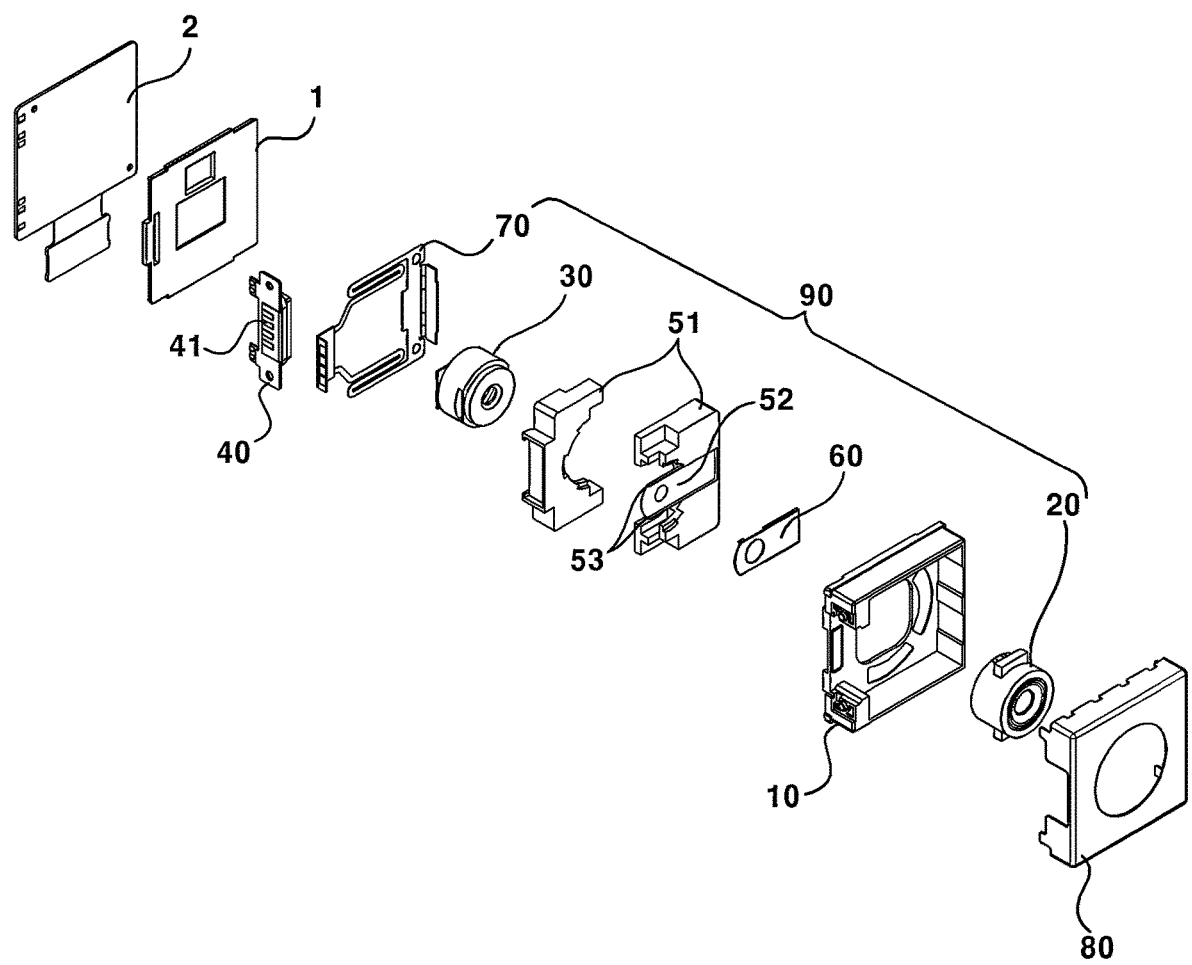
FIG. 2 is an assembled view of a camera module according to the first exemplary embodiment of the present invention.

Meanwhile, the camera module 100, as illustrated in FIG. 2, a housing 10 formed with a space therein is disposed at front side with respect to the base 1, and a first substrate 2 is disposed at rear side.

At this time, the base 1 is configured to have a size sufficient to accommodate the area of the back surface of the housing 10, and a rectangular through hole is formed at the center, so that an image sensor to be mounted on the first substrate 2 can be exposed to the lens through the through hole.

Further, an infrared cut filter is disposed between the lens and the image sensor.

Meanwhile, the housing 10 may have a rectangular box shape, or may be changed to another shape if necessary, and a space for accommodating other members therein is formed, and an opening portion 11 is formed at a side surface thereof.

A lens set 90 is disposed in the inner space of the housing 10 and the lens set 90 is movable along the front-to-rear direction for autofocusing within the housing 10.

Of course, the conventional lens driving devices for auto focusing may be separately disposed inside the housing 10, and a bobbin or the like for driving the lens may also be mounted on the outer surface of the lens set 90, and thereby performs the moving function of the lens set 90.

If necessary, it may be implemented by a first magnet fixed to the lens set 90, a first coil corresponding to the first magnet provided on the side of the housing 10, and a first driving unit comprising a first Hall sensor which recognizes the position of the lens set 90.

At this time, a guide ball or the like having a low friction characteristic is disposed between the lens set 90 and the housing 10.

That is, the lens set 90 is transported along the up-down direction within the housing 10 by the first drive unit.

Meanwhile, the lens set 90 is disposed with a first lens barrel unit 20 at front thereof, a diaphragm set 50 at the rear side of the first lens barrel unit 20, and a second lens barrel unit 30 at the rear side of the diaphragm set 50, respectively.

The lens barrel comprising the first lens barrel unit 20 and the second lens barrel unit 30 comprises a plurality of unit lenses, and the number of lenses is not particularly limited.

Here, the diaphragm set 50 performs the role of supporting the entire lens set 90 while contacting the inner surface of the housing 10.

The lens barrel, that is, the first lens barrel unit 20 and the second lens barrel unit 30, is disposed in a way that the optical axes are aligned with each other, and the diaphragm set 50 also performs the basic function of a diaphragm to adjust the diameter of an incident light into the first lens barrel unit 20.

Once the lens set 90 is assembled inside the housing 10, a cover 80 is coupled to the front side of the housing 10.

The cover 80 may be implemented in the form of a shield can that shields the electromagnetic waves, and at the center thereof a circular hole is formed so that the front of a unit lens located at the end of the first lens barrel unit 20 may be exposed externally, and the end thereof is coupled with the housing 10 and secured.

Figure 3:
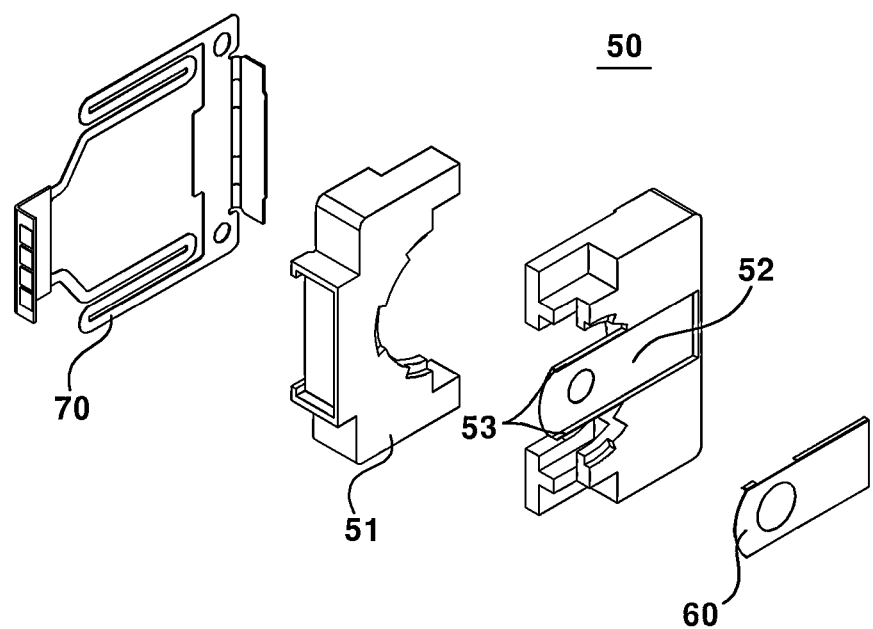
FIG. 3 is a configuration diagram of a diaphragm set included in the camera module of the first exemplary embodiment of the present invention.

As shown in FIG. 3, the diaphragm set 50 is constructed first with a diaphragm support unit 51.

The diaphragm support unit 51 is seated on the inner surface of the housing 10 and can move along the front-to-rear direction within the housing 10 and serves as a structure for supporting the entire diaphragm set 50.

Further, a first magnet, which is a component of the first drive unit, is fixed.

In addition, if necessary, it may be configured to be a type wherein a plurality of members are mutually coupled, and a receiving part 52 is formed at the center so that a diaphragm part 60 can be seated therein.

The diaphragm part 60 is coupled to the receiving part 52 and a guide portion 53 is formed to facilitate the coupling of the diaphragm part 60. The guide portion 53 is configured such that the diaphragm part 60 is inserted therein and guided thereby. However, if necessary, the guide portion 53 may be implemented using a projection or the like.

The diaphragm support unit 51 is formed with a first lens coupling portion at front wherein the first lens barrel unit 20 is seated, and comprises a second lens coupling portion at rear wherein the second lens barrel unit 30 is seated.

Of course, the first lens coupling portion and the second lens coupling portion may be formed of a conventional coupling structure such as a protrusion, a step portion, or the like which can be simply coupled with the first lens barrel unit 20 and the second lens barrel unit 30.

Figure 4:
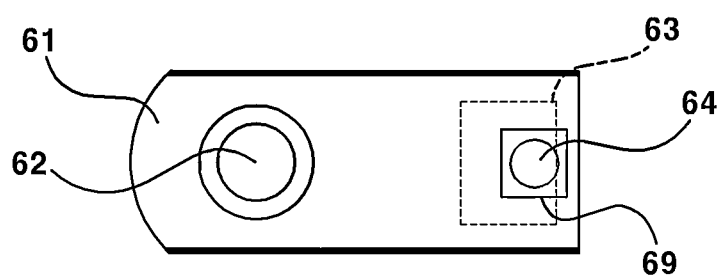
FIG. 4 is a configuration diagram of a diaphragm included in the camera module according to the first exemplary embodiment of the present invention.

The diaphragm set 50 comprises a diaphragm part 60 shown in FIG. 4, and the diaphragm part 60 is configured to comprise a body portion 61 formed with a hole 62 whose center coincides with the optical axis of the lens of the first lens barrel unit 20.

In addition, it comprises an adjustment portion 63 comprising a blade unit (not shown) for adjusting the degree of opening of the hole 62 and a second drive unit comprising a second magnet and a second coil for coupling with the blade unit for operating thereof, and comprises a second Hall sensor 64 for recognizing the operation position of the control portion 63.

The second hall sensor 64 senses a change in magnetic force of the adjustment portion 63 according to the position of the second magnet and recognizes the degree of opening of the adjustment portion 63.

Therefore, the operating position of the adjustment portion 63 is recognized by the signal of the second Hall sensor 64, the position of the blade unit is determined according to the operating position of the adjustment portion 63, and finally the opening degree of the hole 62 can be recognized.

The configuration of the diaphragm part 60 described above is the same as that of a normal diaphragm, and the blade unit can be implemented in various forms, however, in the case of a small camera device, it is preferable to be implemented in a form wherein two blade units are disposed symmetrically to control the degree of opening of the hole 62.

Meanwhile, the diaphragm part 60 according to the present invention, in addition to the above constituting elements, further comprises a control portion 69 for controlling the degree of opening of the adjustment portion 63 by processing signals of the second hall sensor 64.

That is, the control portion 69 controls the adjustment portion 63 based on the signal from the second Hall sensor 64, thereby controlling the degree of the opening of the hole 62.

The control portion 69 may be configured separately, but may be configured to comprise the second Hall sensor 64 embedded therein, if necessary.

In this case, the control portion 69 is preferably disposed at a position where the second Hall sensor 64 is located.

According to the configuration of the control portion 69 as described above, it is not necessary to export the signal of the second hall sensor 64 to the outside, therefore, if the diaphragm part 60 is configured to be connected to the output terminals using four wirings, that is, one power line, one ground line, and two control lines, the entire control becomes possible only by connecting the external control device to the output terminals.

The two control lines may be implemented as communication lines for Inter-Integrated Circuit (I2C) communication, and at this time, the control portion 69 is configured to comprise a communication module for the I2C communication.

In addition, when the first drive unit for auto-focusing is included, it is preferable to dispose the second Hall sensor 64, or the control portion 69 comprising the Hall sensor 64 is located at a position where the interference of the first magnet is minimized, so that the operating position of the second magnet of the adjustment portion 63 is detected.

Figure 5:
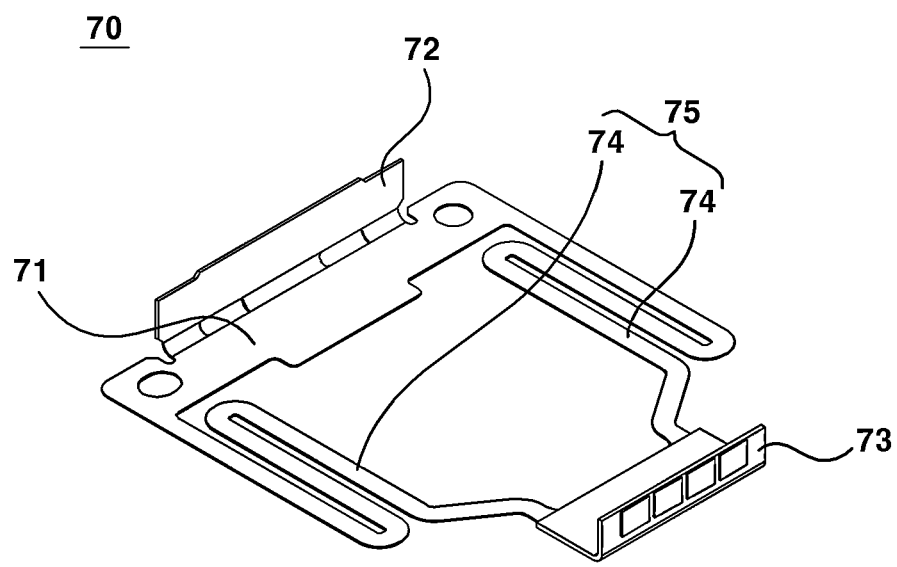
FIG. 5 is a configuration diagram of an elastic supporting unit included in the camera module according to the first exemplary embodiment of the present invention.
Figure 6:
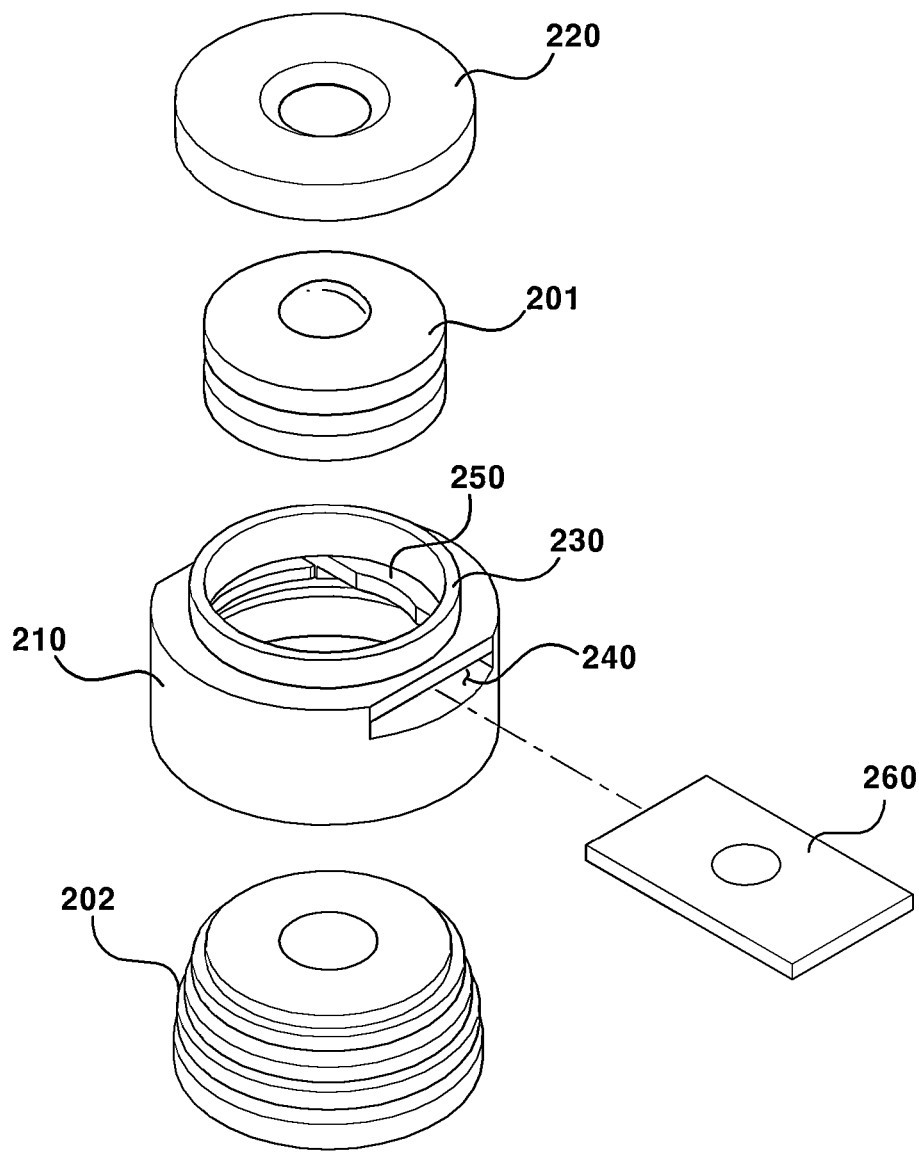
FIG. 6 is an assembled view showing the entire configuration of a camera lens barrel having a diaphragm device according to a second exemplary embodiment of the present invention.

Meanwhile, the diaphragm set 50 comprises an elastic support unit 70 as illustrated in FIG. 5.

The elastic support unit 70 is composed of FPCB and comprises: a fixing portion 71 which is in contact with one surface of the diaphragm support unit 51; a vertical coupling portion 72 which couples with the diaphragm part 60; a vertical drawing portion 73 coupled to a drawing member 40; and an elastic portion 75 comprising a plurality of unit elastic portions 74 disposed between the fixing portion 71 and the vertical coupling portion 72 to provide elastic characteristics.

Of course, the elastic support unit 70 may be formed in the shape of a flat plate initially so that when assembled, the vertical coupling portion 72 and the vertical drawing portion 73 are folded and coupled thereto, however, if necessary, it also may be manufactured in an initially bent form.

In the elastic support unit 70, four wirings are disposed at the vertical coupling portion 72, the fixing portion 71, the elastic portion 75, and the vertical drawing portion 73.

The wiring of the vertical connecting portion 72 is electrically connected to the diaphragm part 50, and the wiring of the vertical drawing portion 60 is connected to the four terminals 41 disposed on the surface of the drawing member 40, respectively.

The elastic portion 75 is configured to include unit elastic portions 74 spaced apart from each other, and the unit elastic portions 74 are configured to be composed of a plurality of bent portions to impart an appropriate elasticity thereto, thereby corresponding to the movement of the lens set 90.

Meanwhile, the second substrate 40 is coupled to the opening portion 11 formed on the side surface of the housing 10. Four terminals 41 extended vertically are attached to the surface of the second substrate 40. The vertical drawing portion 73 of the elastic supporting unit 70 contacts the second substrate 40, and at the same time, the vertical drawing portion 73 are electrically connected to the terminals 41.

On the rear surface of the second substrate 40, the first coil is disposed, and a first Hall sensor is located at the center of the first coil, thereby corresponding to the first magnet attached to the diaphragm support unit of the lens set 90, and performs up-down transport of the entire lens set 90.

The first coil and the first Hall sensor are electrically connected to the lower terminal 41, and the upper terminal 41 and the lower terminal 41 are electrically connected through soldering so that the first drive unit and the second drive unit are configured to share the same wiring.

Further, both ends of the second substrate 40 are mounted on the first substrate 2 and interlocked with an external control device, and the first and second drive units can be selectively driven by I2C communication with the control device.

On the other hand, in the case of the lens driving device, that is, the first drive unit, for auto focusing, the number of power lines being used may vary depending on the driving method, however, as described above, most types of power lines are configured to include a power line, a ground line, and two communication lines for I2C communication.

That is, since four wirings are used and the properties of each wiring are also the same as those used for the diaphragm set 50 according to the present invention, the first drive unit and the diaphragm set 50, that is the second drive unit, according to the present invention, and therefore, there is an advantage in that the terminals can be used in common. This allows that both devices can be implemented through the same terminal according to the characteristics of I2C communication, thereby reducing the soldering pad, and besides, there is an advantage in that the risk of UV curing during active alignment can be minimized according to the overall structural characteristics.

On the other hand, even when the number of wirings of the lens driving device is less than four, the same advantage is obtained in the case of sharing the common terminals with the wiring of the diaphragm set 50 according to the property of the wiring.

Hereinafter, the optical device according to the present first exemplary embodiment will be described.

The optical device may be a hand phone, a mobile phone, a smart phone, a portable smart device, a digital camera, a laptop computer, a digital broadcasting terminal, a personal digital assistant (PDA), a portable multimedia player (PMP), navigation, and the like. However, it is not limited thereto, and any device for capturing an image or a photograph is possible.

The optical device may comprise a main body (not shown), a display unit (not shown), and a camera module 100.

The main body can form the appearance of the optical device. The main body may comprise, for example, a rectangular parallelepiped shape. However, it is not limited thereto. Alternatively, at least a portion of the main body may be rounded. The main body can accommodate the camera module 100. A display unit may be disposed on one side of the main body.

The camera module 100 may be disposed in the main body. The camera module 100 may be disposed on one side of the main body. At least a part of the camera module 100 may be accommodated inside the main body. The camera module 100 can take an image of a subject. The camera module 100 may be electrically connected to the display unit.

The display unit may be disposed in the main body. The display unit may be disposed on one side of the main body. That is, the display unit may be disposed on the same plane as the camera module 100. Alternatively, the display unit may be disposed on a side different from the one side of the main body. At least a part of the display unit can be accommodated in the main body. The display unit may be disposed on a side opposite to the side where the camera module 100 is disposed. The display unit may output an image or an image signal captured by the camera module 100 as a visualized image or an image.

Hereinafter, the second preferred exemplary embodiment according to the present invention will be described in detail with reference to the accompanying drawings.

A camera lens barrel 200 comprising a diaphragm device according to the second exemplary embodiment of the present invention comprises: a body 210 having the shape of a cylinder; a lens cap 220 being inserted from the front side of the body 210; a coupling hole 240 formed in a side surface of the body 210; a separating stage 250 formed on an inner surface of the body 210; a front lens group 201 being inserted from the front side of the body 210; a rear lens group 202 being inserted from the rear side of the body 210; and a diaphragm 260 coupled through a coupling hole 240.

First, the body 210 has an inner diameter portion in the form of a through hole, thereby possibly accommodating other members.

Although the body 210 is disclosed as a cylindrical shape, it may be formed in other shapes as needed. The inner diameter portion formed inside the body 210 may also be formed in a cylindrical shape or other shapes as necessary.

At this time, the front lens group 201 and the rear lens group 202 to be inserted are shaped so as to coincide with the shape of the inner diameter portion of the body 210.

Figure 7:
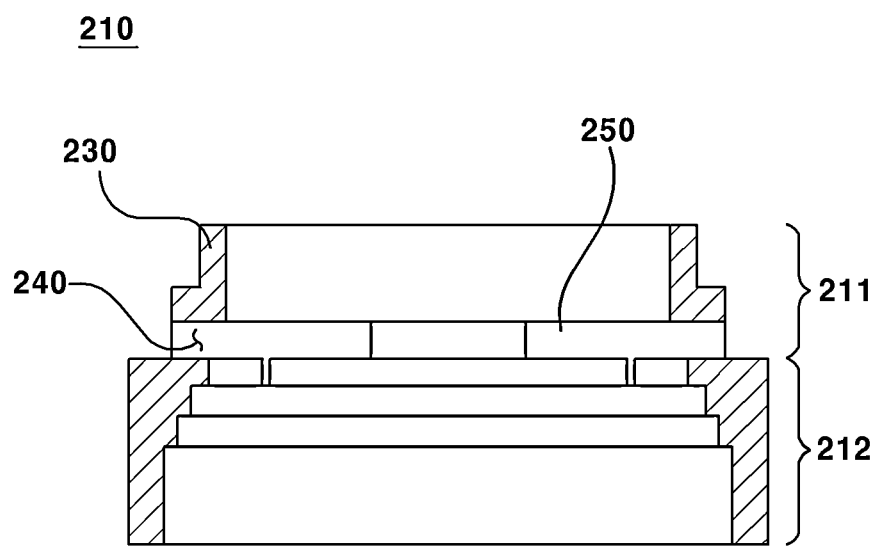
FIG. 7 is a configuration diagram of a body included in a camera lens barrel having a diaphragm device according to the second exemplary embodiment of the present invention.

As illustrated in FIG. 7, the body 210 is divided into an upper section 211 and a lower section 212, and it is preferable to be configured in a way that the upper section 211 may have a smaller diameter than the lower section 212, and the diameter of the inner diameter portion is configured to be different depending on the diameters of the front lens group 201 and the rear lens group 202 to be coupled.

Especially, in the inner diameter portion of the lower section 212, a plurality of stages having different diameters are formed for the seating of the rear lens group 202 composed of a plurality of lenses having different diameters, and at this time, lenses are inserted sequentially from the one having a smaller diameter.

The body 210 comprises a separating stage 250 located at the inner diameter portion, and the separating stage 250 is located inside the upper section 211 and one surface thereof is located at the surface interfacing between the lower section 212 and the upper section 211.

Figure 8:
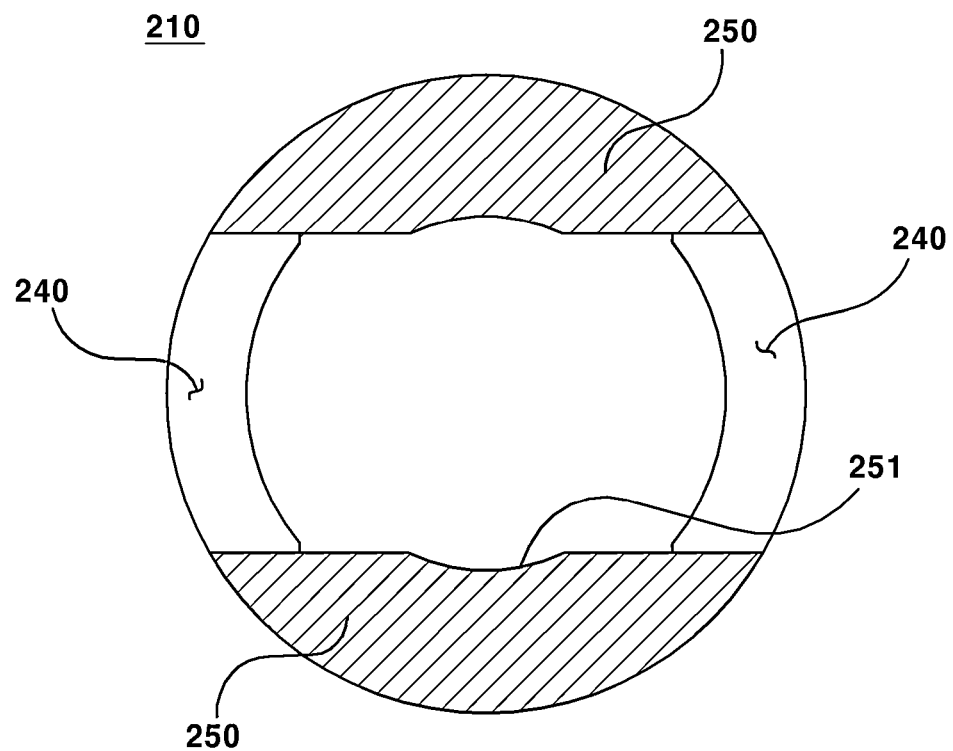
FIG. 8 is a configuration diagram of a separating stage included in a camera lens barrel having a diaphragm device according to the second exemplary embodiment of the present invention.

As illustrated in FIG. 8, the separating stage 250 is composed of two members having the same shape, which are disposed to face each other in the lateral direction on the inner side of the inside of the body 210.

In addition, a circular arc portion 251 is formed at the center of the separating stage 250 with the center of the inner diameter of the body 210 as the origin.

The separating stage 250 may be made of the same material as the body 210 and may be integrally formed with the body 210 if necessary.

In the case of a synthetic resin material, it is advantageous from a manufacturing point of view that the body 210 and the separating stage 250 are configured to be formed through an injection molding method using a single material, however, it is also possible that they may be composed of different materials and manufactured by combining through a separate attachment process.

Meanwhile, the front lens group 201 is inserted from the front side of the body 210, and the downward movement of the front lens group 201 in the downward direction is limited by the separating stage 250, and the front side is fixed by a lens cap 220.

At this time, the lens cap 220 is coupled to a cap fixing portion 230 formed on the upper section 211 of the body 210, and is fixed to each other by a method such as bonding and the like, if necessary.

Accordingly, the front lens group 201 is fixed inside the body 210 by the separating stage 250 and the lens cap 220.

At this time, a separate lens hole 221 may be formed at the center of the lens cap 220, and it may be implemented in a way that a protruded portion of the lens located at the upper end of the lens of the front lens group 201 is inserted into the lens hole 221.

Although the front lens group 201 is described as two lenses and the rear lens group 202 as four lenses, the number of lenses can be changed as needed.

The optical axis of the front lens group 201 and the optical axis of the rear lens group 202 are preferably aligned with the central axis of the body 210.

Figure 9:
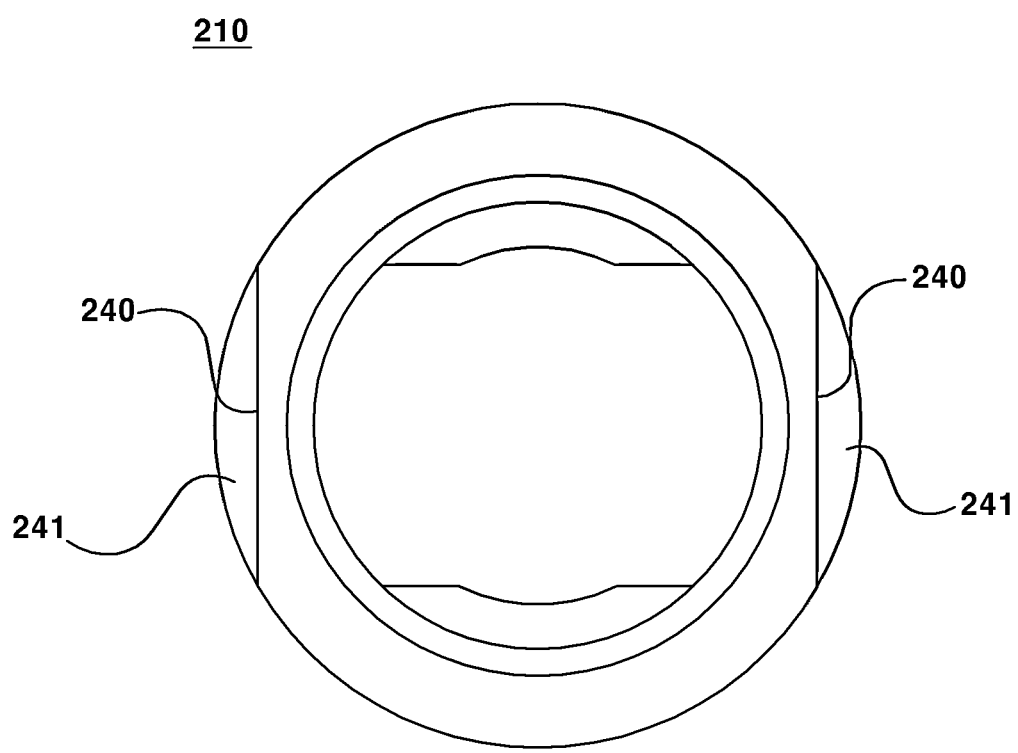
FIG. 9 is a configuration diagram of a coupling hole included in a camera lens barrel having a diaphragm device according to the second exemplary embodiment of the present invention.

Meanwhile, as shown in FIG. 9, two coupling holes 240 are located at where the separating stage 250 is formed inside the side surface of the body 210 so as to oppose against each other.

The coupling hole 240 serves as an opening of the body 210 and the coupling space of the coupling holes 240 is the same as the open space of the separating stage 250.

Also, if necessary, the coupling hole 240 may be formed only on one side surface of the body 210.

Meanwhile, in the body 210 wherein the coupling hole 240 is formed, a partially cut outer end 241 is formed, and preferably, the outer end 241 is formed at a right angle with respect to the optical axis.

Further, since the diaphragm 260 is inserted into the coupling hole 240 and is perpendicular to the optical axis of the outer end 241, the diaphragm 260 can be easily assembled. It is advantageous in that the coupling position of the diaphragm 260 can be accurately set, especially when the portion where the one end of the diaphragm 260 is located is marked on the outer end 241 or a stopper is formed.

Meanwhile, in the case of forming the single coupling hole 240, if the end of the diaphragm 260 to be inserted into the body 210 is formed of an arc having the same curvature as the inner diameter of the body 210, it is advantageous in that precise coupling within the body 210 can be achieved.

The diaphragm 260 includes a diaphragm for adjusting the opening area, an actuator for adjusting the degree of opening of the diaphragm, a control line for controlling the operation of the actuator, and a sensor unit for recognizing the degree of opening of the diaphragm. And a common diaphragm structure for adjusting the degree of opening of the diaphragm portion by a separate control unit.

Hereinafter, preferred embodiments according to the third exemplary embodiment of the present invention will be described in detail with reference to the accompanying drawings.

Figure 10:
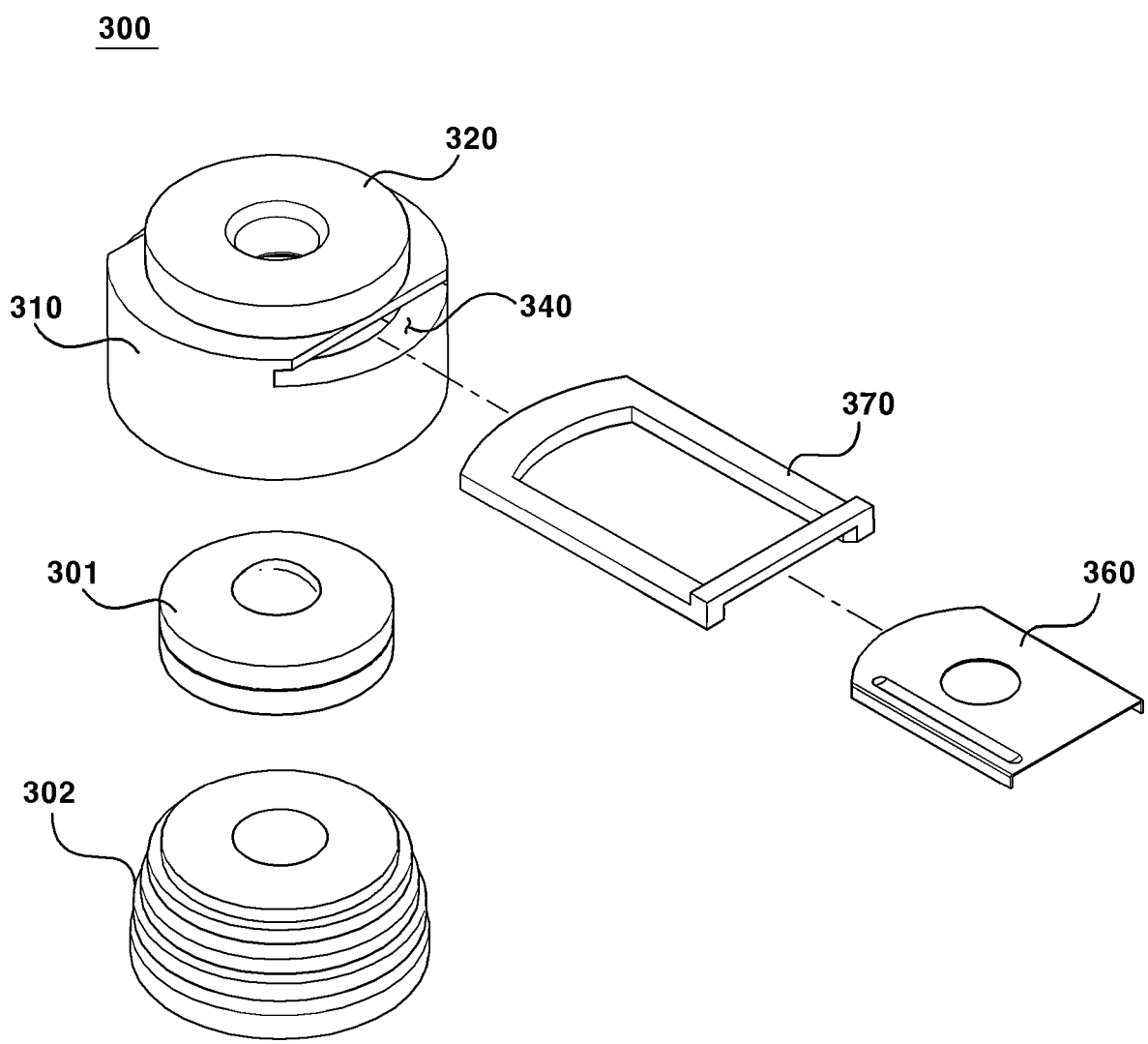
FIG. 10 is an assembled view showing an overall configuration of a camera lens barrel having a diaphragm device according to a third exemplary embodiment of the present invention.

A first exemplary example of the camera lens barrel 300 comprising a diaphragm device according to a third exemplary embodiment of the present invention, as illustrated in FIG. 10, comprises: a body 310 having the shape of a cylinder; a coupling groove 340 formed on a side surface of the body 310; a front lens group 301 being inserted from the rear of the body 310 and positioned at the front side within the body 310; a rear lens group 302 being inserted from the rear of the body 310 and positioned in rear side within the body 310; a bracket 370 being inserted into the coupling groove 340 after the insertion of the front lens group 310 but prior to the insertion of the rear lens group 302; and an aperture 360 coupled to the inside of the bracket 370.

First, the body 310 has an inner diameter portion in the form of a through hole to accommodate other members.

Although the body 310 has been described as a cylindrical shape, it may be formed in other shapes as required, and the inner diameter portion formed in the body 310 may also be cylindrical or may have other shapes as necessary.

The front lens group 301 and the rear lens group 302, which are inserted at this time, are shaped so as to match the shape of the inside of the body 310.

Figure 11:
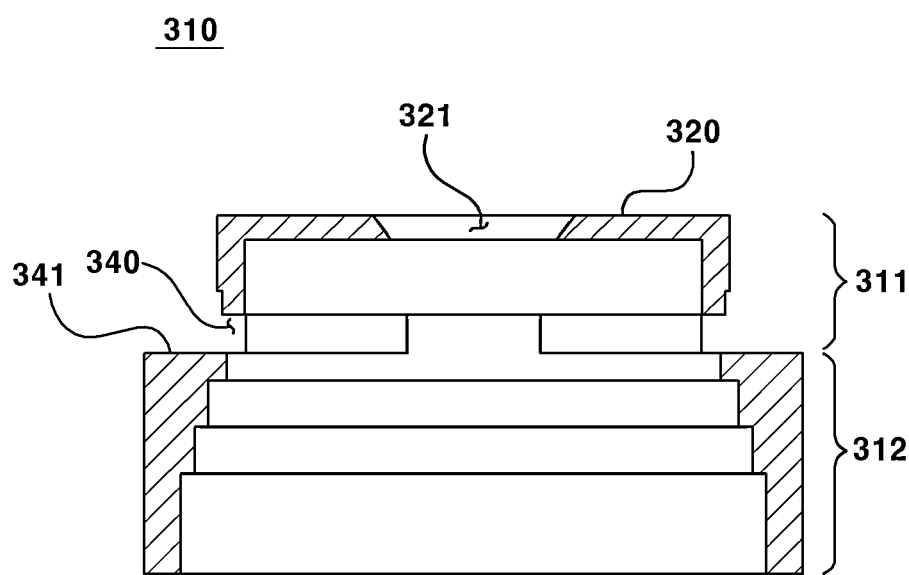
FIG. 11 is a cross-sectional view of a body included in a camera lens barrel having a diaphragm device according to the third exemplary embodiment of the present invention.

As illustrated in FIG. 11, the body 310 is divided into an upper section 311 and a lower section 312. The diameter of the upper section 311 is preferably smaller than the diameter of the lower section 312, and the diameter of the inner diameter portion is configured to vary depending on the diameters of the front lens group 301 and the rear lens group 302 which are to be coupled.

The upper section 311 is formed with a cap portion 320 to support the front lens group 301 to be inserted, and a front hole 321 is formed at the center of the cap portion 320 to expose the front lens group 301 towards the outside.

A plurality of stages having different diameters are formed in the inner diameter portion of the lower section 312 for the seating of the rear lens group 302 composed of a plurality of lenses having different diameters, and at this time, the lenses are inserted sequentially from the one having a smaller diameter.

On the other hand, the front lens group 301 is inserted from the lower end of the body 310 and is supported by the cap portion 320.

Therefore, the front lens group 301 is configured to be equal to or smaller than the lens having smallest diameter of the rear lens group 302.

Here, it is disclosed as the front lens group 301 has two lenses and the rear lens group 302 has four lenses, but the number of lenses can be changed as needed.

The optical axis of the front lens group 301 and the optical axis of the rear lens group 302 are preferably aligned with the central axis of the body 310.

On the other hand, as illustrated in FIG. 11, two coupling grooves 340 are positioned in the direction opposing against each other at the upper side of lower section 312 of the body 310.

The coupling grooves 340 serve as openings of the body 310 and the first lens group 301 and the second lens group 302 are not located in the space connecting the two coupling grooves 340.

The body 310 formed with the coupling groove 340 is formed with an outer end 341 partially cut away, and preferably, the outer end 341 is formed at a right angle with respect to the optical axis.

Figure 12:
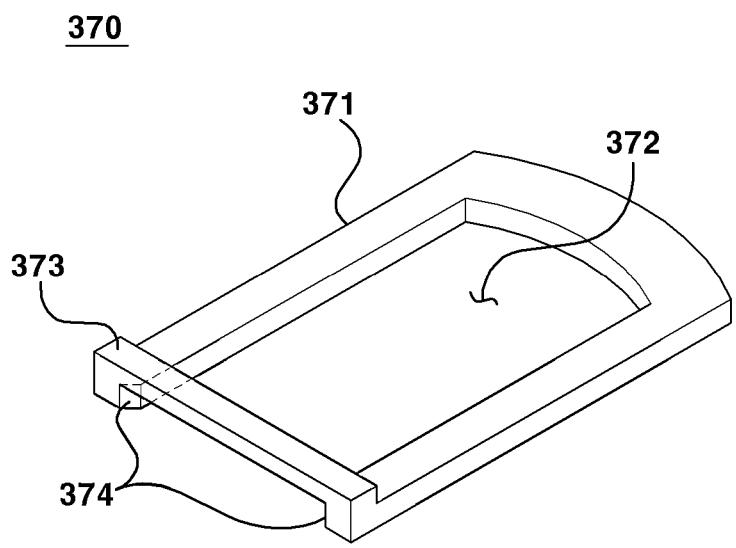
FIG. 12 is a block diagram of a bracket included in a camera lens barrel having a diaphragm device according to the third exemplary embodiment of the present invention.
Figure 13A:
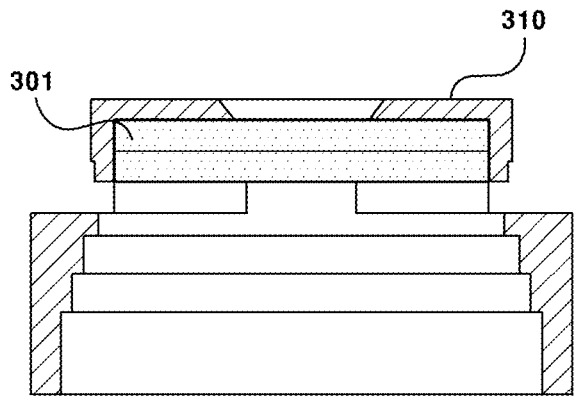
FIGS. 13a-13c are explanatory views showing a procedure for assembling a camera lens barrel having a diaphragm device according to the third exemplary embodiment of the present invention.
Figure 13B:
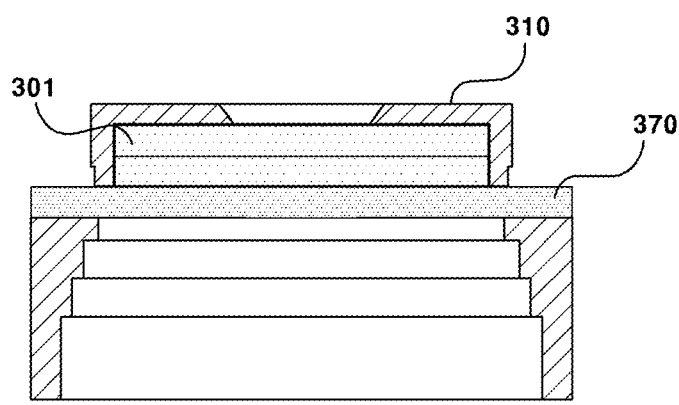
Figure 13C:
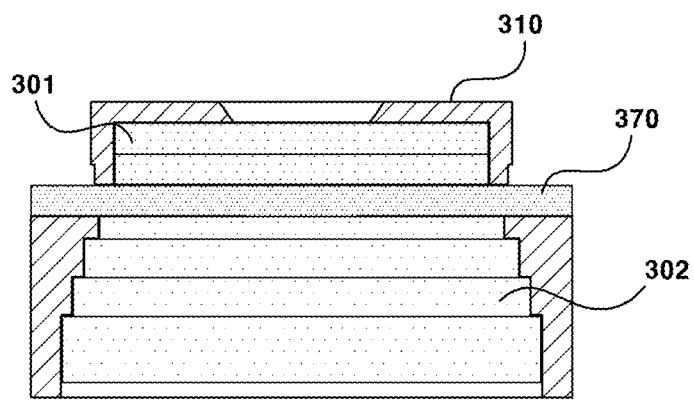

As illustrated in FIG. 12, a bracket 370 is inserted into the one coupling groove 340, and the bracket 370 is inserted into an empty space in which the lens groups 301 and 302 are not located in the body 310, and is exposed through the other coupling groove 340.

The bracket 370 is formed in the shape of a letter "⊏" having the same thickness and comprises a support 371 provided with an opening 372, a protruded end 373 upwardly protruding from the upper surface of the support 371, and an inclined portion 374 formed on both ends of the support 371.

A diaphragm 360 is positioned in the opening 372 formed in the support 371 and the inclined portion 374 guides the insertion of the diaphragm 360 accurately.

The protruded end 373 serves as a stopper when inserting the bracket 370 into the coupling groove 340 and serves to guide the precise coupling of the bracket 370, and since the protruded end 373 is located at the upper end of the support 371, the opening 372 is exposed at the end of the support 371.

Of course, the bracket 370 is assembled in such a manner that the bracket 370 is inserted into the coupling groove 340 firstly from the opposite side with respect to the protruded end 373 is formed, and when necessary, the bracket 370 is coupled to the body 310 through bonding or the like.

If necessary, a diaphragm groove 375 may be formed on the inner surface of the support 371 of the bracket 370 so that a portion of both side surfaces of the diaphragm 360 can be inserted, and it is preferable that the diaphragm groove 375 is formed so as to extend up to the correct coupling position of the diaphragm.

After the bracket 370 is coupled to the body 310, the diaphragm 360 is inserted through the lower end of the protruded end 373 of the opening 372 of the bracket 370.

At this time, if a diaphragm groove 375 is formed at the inner surface of the support 371, the diaphragm 360 is inserted into the diaphragm groove 375.

If necessary, the diaphragm 360 may also be fixed to the bracket 370 by separate bonding or the like to inhibit separation.

Here, the diaphragm 360 comprises a diaphragm for adjusting the opening area, an actuator for adjusting the degree of opening of the diaphragm, a control line for controlling the operation of the actuator, and a sensor unit for recognizing the degree of opening of the diaphragm, and thereby configured to include a typical diaphragm structure for adjusting the degree of opening of the diaphragm part by a separate control unit.

Meanwhile, the camera lens barrel 300 according to the present invention, as illustrated in FIG. 4, first, once the body 310 is prepared, the front lens group 301 is inserted from the rear of the body 310. Next, the bracket 370 is inserted into the coupling groove 340, the bracket 370 is fixed to the body 310, and thereafter, the rear lens group 302 is sequentially inserted and fixed. Later, the diaphragm 360 is inserted into the bracket 370 and fixed.

At this time, if necessary, the diaphragm 360 may be coupled immediately after the bracket 370 is coupled to the body 310.

Accordingly, it is advantageous in that, the bracket 370 serves to support the lower end lens of the front lens group 301 and the upper end lens of the rear lens group 302, and at the same time, the diaphragm 360 can be conveniently combined.

Meanwhile, the camera lens barrels 200 and 300 according to the second and third exemplary embodiments of the present invention can be applied to a small-sized camera module for a portable terminal, and at this time, it is coupled to the bobbin among the driving devices, and if necessary, an autofocusing device, an image stabilization device, and the like may be additionally provided, and it may be implemented as a configuration including a printed circuit board comprising an image sensor for changing an optical lens mounted on the lens barrels 200 and 300 into an image, an infrared cut filter, and the like.

For example, the lens barrels 200 and 300 are disposed on one side of the base forming the entire structure of the camera module.

An image sensor is disposed on the other side of the body where the lens barrels 200 and 300 are disposed, and the image sensor being aligned with the optical axis of the lens barrels 200 and 300 and mounted on the substrate is disposed.

Further, an infrared cut filter may be disposed between the lens barrels 200 and 300 and the image sensor, thereby constituting a final camera module.

Also, the camera module may be implemented as one exemplary embodiment of the following optical device.

In here, the optical device may be a hand phone, a mobile phone, a smart phone, a portable smart device, a digital camera, a laptop computer, a digital broadcasting terminal, a personal digital assistant (PDA), a portable multimedia player (PMP), navigation, and the like. However, it is not limited thereto, and any device for capturing an image or a photograph is possible.

The optical device may comprise a main body (not shown), and the above described camera module.

The main body can form the appearance of the optical device. The main body may comprise, for example, a rectangular parallelepiped shape. However, it is not limited thereto. Alternatively, at least a portion of the main body may be rounded. The main body can accommodate the camera module. A display unit may be disposed on one side of the main body.

The camera module may be disposed in the main body. The camera module may be disposed on one side of the main body. At least a portion of the camera module may be accommodated in the main body. The camera module can take an image of a subject. The camera module may be electrically connected to the display unit.

The display unit may be disposed in the main body. The display unit may be disposed on one side of the main body. That is, the display unit may be disposed on the same plane as the camera module. Alternatively, the display unit may be disposed on a side different from the one side of the main body. At least a part of the display unit can be accommodated in the main body. The display unit may be disposed on a side opposite to the side where the camera module is disposed. The display unit may output an image or an image signal captured by the camera module as a visualized image or an image.

In the above, to have been described as all the components that make up the exemplary embodiments of the present invention may operate in combination, or combined into one, but the invention is not necessarily limited to these examples. That is, if the object in the scope of the present invention, may be that all of the components are selectively operates in conjunction with more than one. In addition, terms such as "inclusive and", "is configured" or "have" described above is because, which means that unless there is a particular of stated that, the component can be embedded, except for the different components it should not be construed to further include other components. All terms, including technical and scientific terms, have the same meaning as commonly understood by one of ordinary skill in the art to which this invention belongs, unless otherwise defined. Commonly used terms, such as predefined terms, should be interpreted to be consistent with the contextual meanings of the related art, and are not to be construed as ideal or excessively formalistic, unless expressly defined to the contrary.

The invention claimed is:

1. A camera module comprising:
a first substrate;
an image sensor disposed on the first substrate;
a housing disposed on the first substrate;
a lens barrel disposed in the housing;
a lens coupled with the lens barrel;
a diaphragm part configured to adjust the amount of light incident to the lens;
a first coil and a first magnet configured to move the lens barrel in an optical axis direction;
a second coil and a second magnet configured to drive the diaphragm part;
a first Hall sensor configured to sense the first magnet;
a second Hall sensor disposed on a first surface and configured to sense the second magnet;
a control portion disposed on the first surface and configured to control the diaphragm part based on a signal from the second Hall sensor; and
a second substrate disposed on the housing,
wherein the first coil is electrically connected with the second substrate,
wherein the second Hall sensor is electrically connected with the second substrate, and
wherein at least a portion of the control portion overlaps at least a portion of the second Hall sensor in a first direction perpendicular to the first surface.

2. The camera module of claim 1, wherein the second coil is electrically connected with the second substrate.

3. The camera module of claim 1, wherein the first coil and the first Hall sensor are disposed on the second substrate, and
wherein the first Hall sensor is electrically connected with the second substrate.

4. The camera module of claim 1, wherein the second substrate comprises a terminal exposed outside, and
wherein the first coil, the second coil, the first Hall sensor, and the second Hall sensor are electrically connected with the terminal of the second substrate.

5. The camera module of claim 4, wherein the terminal of the second substrate comprises a power line, a ground line, and two control lines.

6. The camera module of claim 5, wherein at least one of the two control lines comprises a line for I2C communication.

7. The camera module of claim 1, wherein the diaphragm part comprises a blade unit configured to move together with the lens barrel in the optical axis direction.

8. The camera module of claim 1, wherein the second substrate comprises a common terminal configured to be used for both driving the first coil and driving the second coil.

9. The camera module of claim 1, wherein the lens comprises a plurality of lenses, and
wherein the diaphragm part is disposed above an uppermost lens of the plurality of lenses.

10. The camera module of claim 1, comprising:
a diaphragm support unit to which the diaphragm part is fixed; and
an elastic support unit having one end attached to the diaphragm support unit and an other end fixed to the second substrate.

11. The camera module of claim 10, wherein a plurality of wirings are disposed in the elastic support unit so that the elastic support unit electrically connects the second substrate and the second coil.

12. The camera module of claim 10, wherein the second Hall sensor is electrically connected with the second substrate through the elastic support unit.

13. The camera module of claim 10, wherein the diaphragm support unit comprises a first lens coupling portion and a second lens coupling portion,
   wherein the lens barrel comprises a first lens barrel unit disposed on the first lens coupling portion and a second lens barrel unit disposed on the second lens coupling portion, and
   wherein the diaphragm part is disposed between the first lens barrel unit and the second lens barrel unit.

14. An optical device comprising:
   a main body;
   a display unit disposed on the main body; and
   the camera module of claim 1 electrically connected with the display unit.

15. The camera module of claim 14, wherein the second coil is electrically connected with the second substrate.

16. The camera module of claim 14, comprising a first Hall sensor disposed on the second substrate and configured to sense the first magnet,
   wherein the first Hall sensor is electrically connected with the second substrate.

17. The camera module of claim 1, wherein the second Hall sensor is embedded in the control portion.

18. A camera module comprising:
   a first substrate;
   an image sensor disposed on the first substrate;
   a housing disposed on the first substrate;
   a lens barrel disposed in the housing;
   a lens coupled with the lens barrel;
   a diaphragm part configured to adjust the amount of light incident to the lens;
   a first coil and a first magnet configured to move the lens barrel in an optical axis direction;
   a second coil and a second magnet configured to drive the diaphragm part;
   a first Hall sensor configured to sense the first magnet;
   a second Hall sensor configured to sense the second magnet;
   a second substrate disposed on the housing;
   a diaphragm support unit to which the diaphragm part is fixed; and
   an elastic support unit having one end attached to the diaphragm support unit and an other end fixed to the second substrate,
   wherein the first coil is electrically connected with the second substrate,
   wherein the second Hall sensor is electrically connected with the second substrate, and
   wherein the elastic support unit comprises a fixing portion contacted with one surface of the diaphragm support unit, a vertical connecting portion coupled with the diaphragm part, a vertical drawing portion coupled with the second substrate, and an elastic portion connecting the fixing portion and the vertical drawing portion and providing elastic characteristics.

19. The camera module of claim 18, wherein the elastic portion comprises two unit elastic portions that impart an elastic characteristic by a plurality of bent portions, and
   wherein the two unit elastic portions are disposed in a symmetrical manner with respect to an opening portion located at a center between the two unit elastic portions.

20. A camera module comprising:
   a housing;
   a lens barrel disposed in the housing;
   a diaphragm part configured to adjust the amount of light incident to the lens barrel;
   a first coil and a first magnet configured to move the lens barrel in an optical axis direction;
   a second coil and a second magnet configured to drive the diaphragm part;
   a second Hall sensor disposed on a first surface and configured to sense the second magnet;
   a control portion disposed on the first surface and configured to control the diaphragm part based on a signal from the second Hall sensor; and
   a second substrate disposed on the housing,
   wherein the first coil is electrically connected with the second substrate,
   wherein the second Hall sensor is electrically connected with the second substrate, and
   wherein at least a portion of the control portion overlaps at least a portion of the second Hall sensor in a first direction perpendicular to the first surface.

* * * * *